(12) United States Patent
Tanaka et al.

(10) Patent No.: US 6,522,831 B2
(45) Date of Patent: Feb. 18, 2003

(54) REPRODUCING APPARATUS

(75) Inventors: Yasuyuki Tanaka, Tokyo (JP); Akihiro Oishi, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/087,847

(22) Filed: Jun. 1, 1998

(65) Prior Publication Data

US 2002/0106200 A1 Aug. 8, 2002

(30) Foreign Application Priority Data

Jun. 5, 1997 (JP) .............................................. 9-147801

(51) Int. Cl.[7] ................................................ H04N 5/91
(52) U.S. Cl. ......................... 386/116; 386/124; 360/32
(58) Field of Search ............................. 386/46, 95, 112, 386/124, 85, 90, 113, 116; 360/32

(56) References Cited

U.S. PATENT DOCUMENTS

| 5,012,459 A | * | 4/1991 | Odaka et al. .................. 360/32 |
| 5,021,897 A | * | 6/1991 | Yoshino et al. ............. 360/72.2 |
| 5,124,851 A | * | 6/1992 | Masui et al. .................. 360/53 |
| 5,365,380 A |   | 11/1994 | Tanaka ....................... 360/10.3 |
| 5,608,740 A | * | 3/1997 | Watanabe .................... 369/24 |

* cited by examiner

*Primary Examiner*—Huy Nguyen
(74) *Attorney, Agent, or Firm*—Fitzpatrick, Cella, Harper & Scinto

(57) ABSTRACT

A reproducing apparatus for reproducing digital data from a recording medium, the digital data including information data and ID data of the information data. The reproducing apparatus checks the reliability of currently reproduced ID data by using the current ID data and ID data reproduced before the current ID data, and corrects an error in the reproduced information data in accordance with the reliability check result.

24 Claims, 16 Drawing Sheets

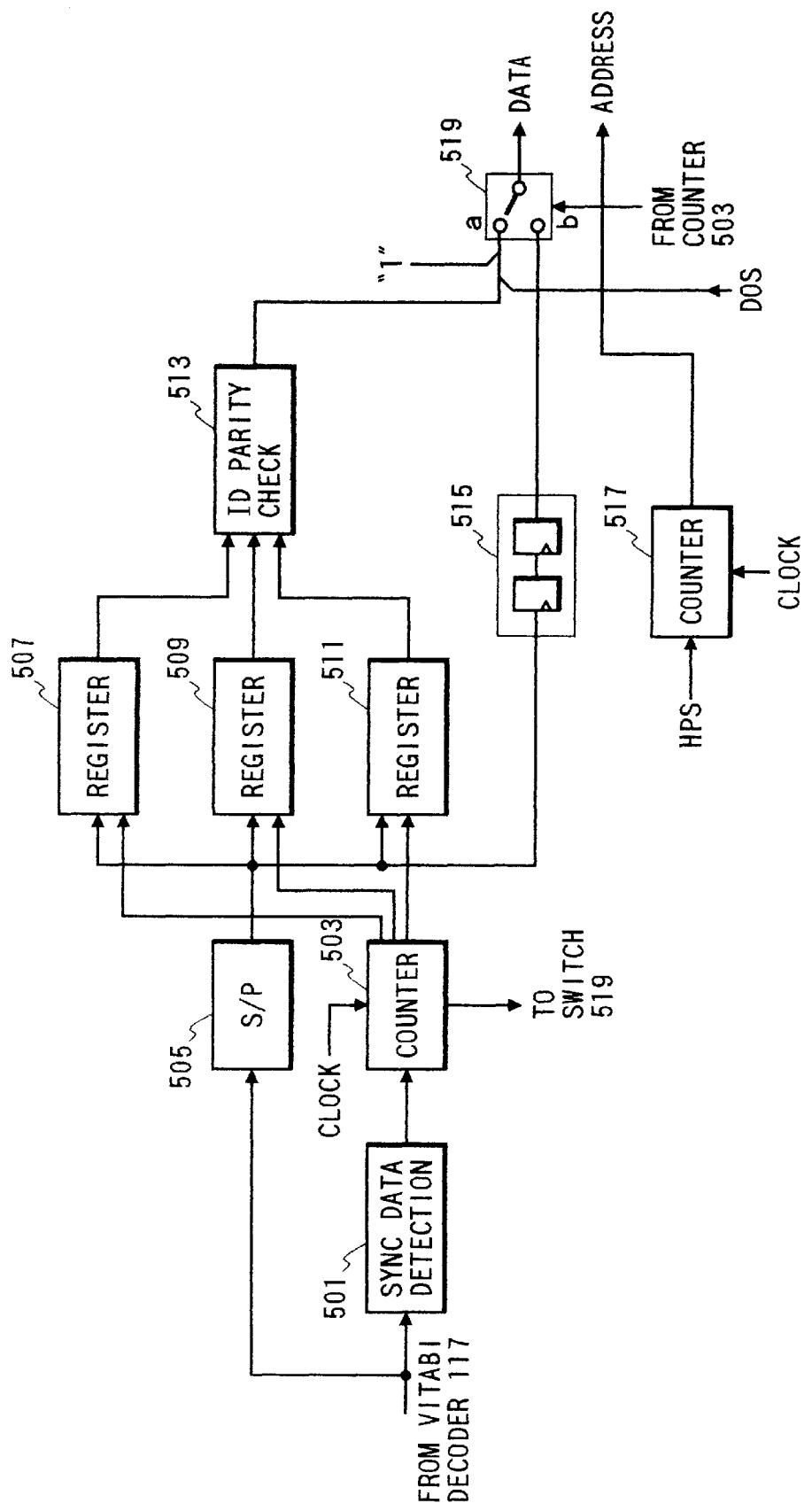

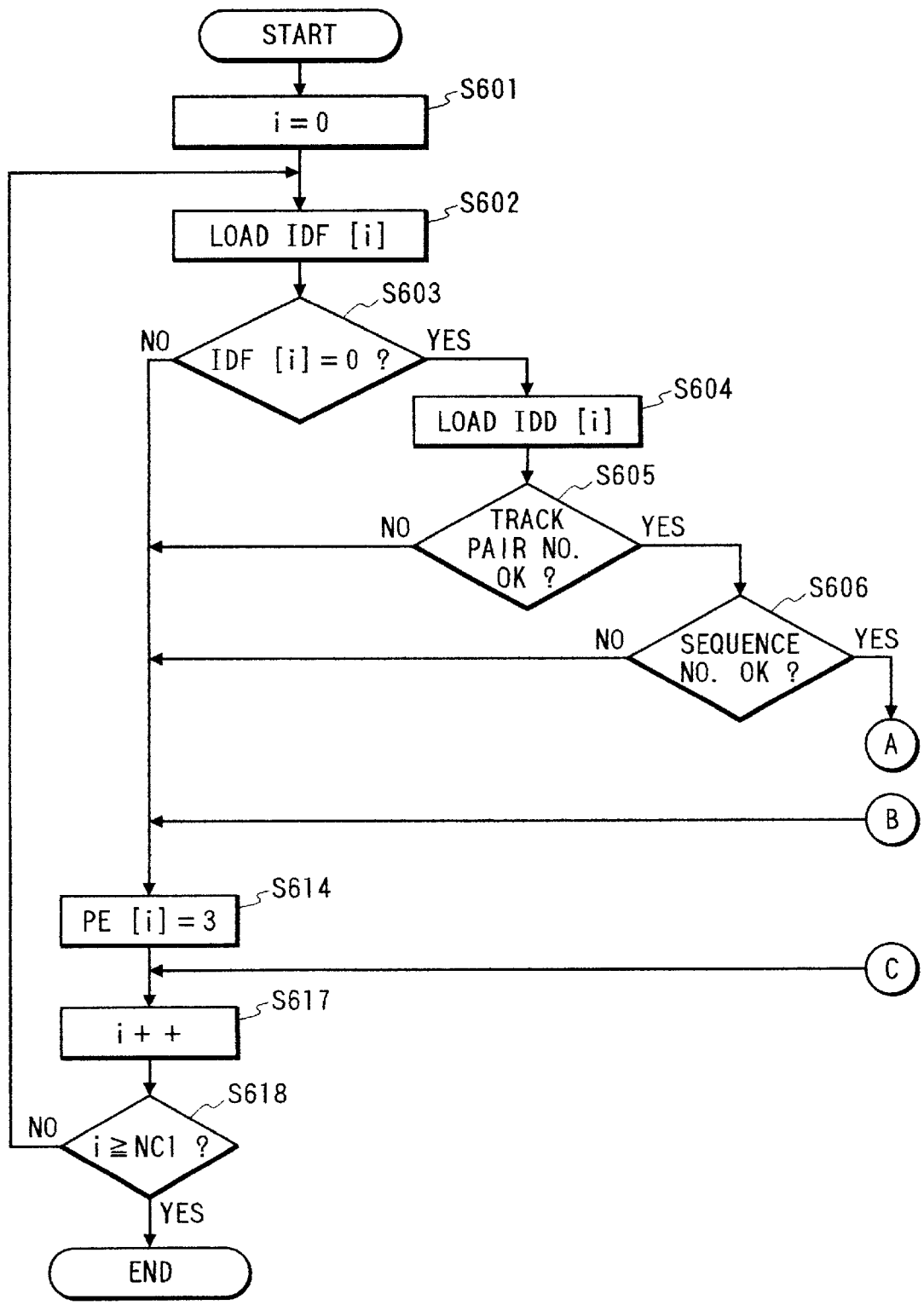

| FIG. 13A | FIG. 13B |

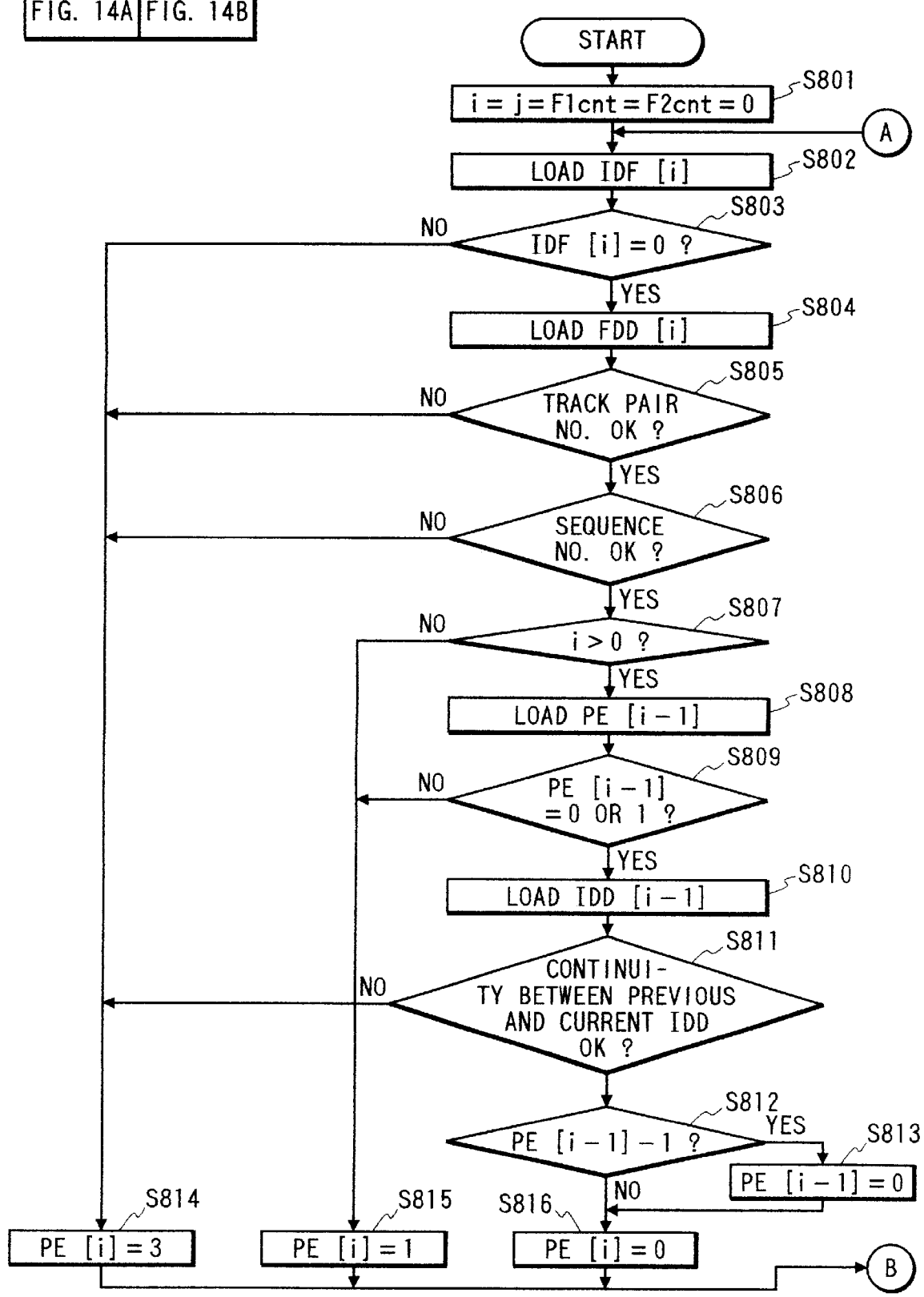

REPRODUCING APPARATUS

BACKGROUND OF THE INVENTION

1. Field of the Invention

The present invention relates to a reproducing apparatus, and more particularly to a technique of processing ID data in a reproduced signal.

2. Related Background Art

A digital VTR is known as an apparatus of this type, in which a digital image signal is recorded in and reproduced from a magnetic tape.

In such a digital VTR, a predetermined amount of main data (audio and visual data) is added with sync data and ID data to form a sync block. Recording/reproducing is performed in the unit of each sync block.

Each sync block is added with parity codes as error correction check codes to correct any error in a reproduced signal in the unit of each sync block.

The ID data added to each sync block contains important information such as information representative of the position of a sync block on a display screen. Therefore, ID data is added with ID parity data to detect and correct any error in the ID during reproduction.

During the reproduction, if an ID parity check shows that the ID data contains an uncorrectable error, it is judged that the address indicated by the ID data is an error, and the address of this sync block is presumed from the ID data of another sync block. In accordance with this presumed address, the reproduced signal is written in a memory to thereby recover the original data.

However, depending upon the type of errors of ID data, even if the ID parity check shows no error, a real error or so-called correction error may occur.

In this case, since the ID parity check shows no error, the reproduced signal is written in the memory at an address indicated by the ID data.

Since the reproduced signal is written in the memory at the address different from the correct address, this reproduced signal is output as large noises if the reproduced signal written at the incorrect address is not corrected by the error correction process using the parity codes.

SUMMARY OF THE INVENTION

It is an object of the present invention to solve the above problem.

It is another object of the present invention to reliably detect any error in ID data.

Under such objects, a preferred embodiment of the invention discloses a reproducing apparatus comprising reproducing means for reproducing digital data from a recording medium formed with a number of tracks, the digital data including information data and ID data, the ID data including track position information of a track recorded with the information data; supplying means for supplying comparison data for a position of a track from which the digital data is reproduced by the reproducing means; checking means for checking a reliability of the ID data by using the comparison data and the track position information in the ID data reproduced by the reproducing means; and error correcting means for correcting any error in the information data.

It is a further object of the present invention to prevent the quality of a reproduced signal from being lowered by errors.

The other objects and features of the present invention will become apparent from the following detailed description of preferred embodiments when read in conjunction with the accompanying drawings.

BRIEF DESCRIPTION OF THE DRAWINGS

FIG. 10 is a diagram showing the structure of a sync/address detector of the apparatus shown in FIG. 1.

DETAILED DESCRIPTION OF THE PREFERRED EMBODIMENTS

Embodiments of the invention will be described in detail with reference to the accompanying drawings.

In the following description of the embodiments, the invention is applied to a digital VTR compatible with a DV format standardized by the HD digital VCR Council.

Figure 1:
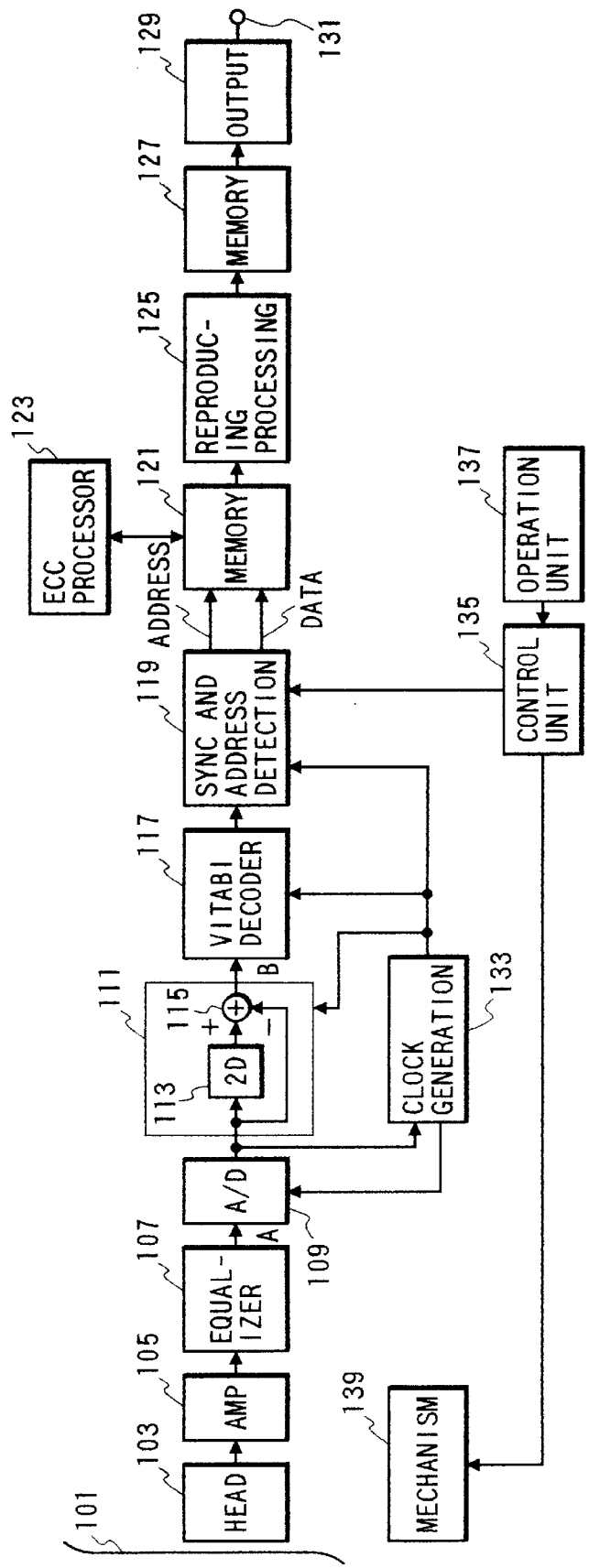
FIG. 1 is a block diagram showing the structure of a digital VTR according to an embodiment of the invention.

FIG. 1 is a block diagram showing the structure of a reproduction system of a digital VTR of the present invention.

Figure 2B:
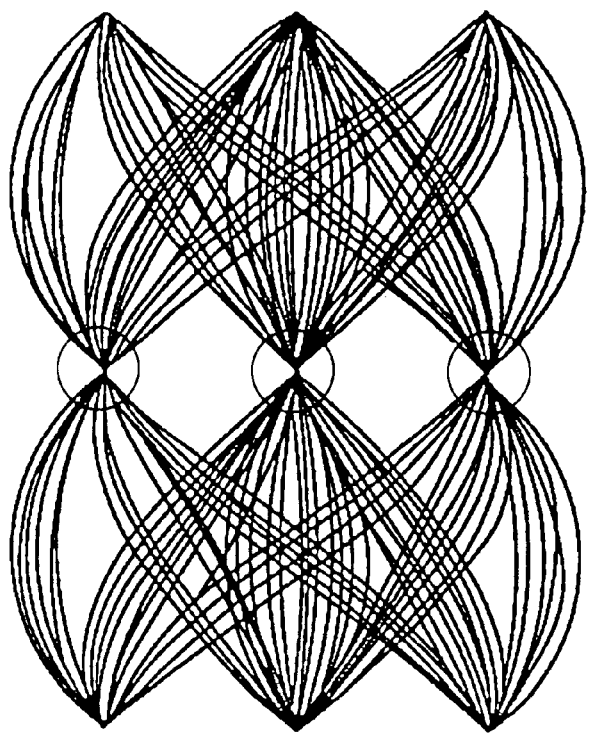
FIGS. 2A and 2B are diagrams showing signals reproduced by the apparatus shown in FIG. 1.
Figure 2A:
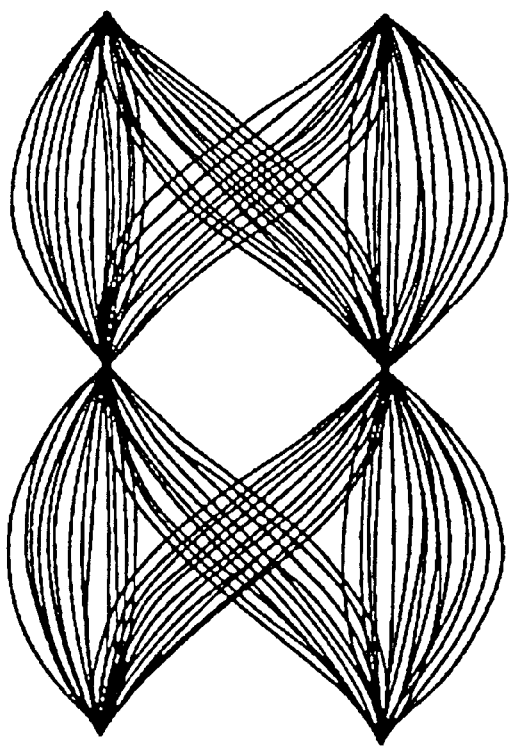

In FIG. 1, a signal reproduced from a tape 101 with a head 103 is amplified by a reproduction amplifier 105 and supplied to an equalizer 107. In the digital VTR of this embodiment, two rotary heads alternately trace a number of helical tracks formed on the tape 101 to reproduce an original signal, the two rotary heads being mounted on a rotary drum at 180° phase-difference positions. The equalizer 107 performs a partial response class-1 equalization (integral equalization) of the reproduced signal to compensate for deterioration of the reproduced signal in the magnetic recording/reproducing system, and outputs the reproduced signal to an A/D converter 109. A waveform of an output signal of the equalizer 107 is shown in FIG. 2A.

The A/D converter 109 samples the reproduced signal output from the equalizer 107 in response to a clock supplied from a clock generator 133, one sample signal being converted into a digital signal of a plurality of bits. The reproduced signal output from the A/D converter 109 is supplied to a partial response class-4 (hereinafter called PR4) equalizer 111 and to the clock generator 133.

The clock generator 133 includes a PLL circuit which generates a clock phase-synchronous with the output signal of the A/D converter 109 and supplies it to the A/D converter 109, the PR4 equalizer 111, a vitabi decoder 117 and to a sync/address detector 119.

The PR4 equalizer 111 has a delay circuit 113 for delaying an output of the A/D converter 109 by two clocks and an adder 115 for calculating a difference between the outputs of the delay circuit 113 and A/D converter 109. The PR4 equalizer 111 performs a PR4 equalizing process for the reproduced signal, and outputs the reproduced signal to the vitabi decoder 117. The waveform of an output signal of the PR4 equalizer is shown in FIG. 2B. Since the reproduced signal has been sampled at the A/D converter 109, the output of the PR4 equalizer 114 is a three-value signal taking the values at circle points shown in FIG. 2B.

The vitabi decoder 117 detects an original two-value signal of one bit per one sample from the output signal of the PR4 equalizer, using a vitabi algorithm. This detected signal is supplied to the sync/address detector 119. As will be described later, the sync/address detector 119 detects sync data and checks ID data by using the reproduced signal supplied from the vitabi decoder 117, to output the reproduced signal and a write address of the memory 121.

This memory 121 can store the reproduced signals of a plurality of frames (in this embodiment, three frames). The reproduced signal is stored in the memory 121 at the write address supplied from the sync/address detector 119. As will be later described, an ECC processor 123 accesses the memory 121 and corrects any error in the reproduced signal stored in the memory 121. In accordance with flag information supplied from the ECC processor 123, the memory 121 recovers uncorrectable error data through interpolation by using data stored in the memory at the previous or succeeding frame, as will be later described.

The reproduction signal corrected by the ECC processor 123 is sequentially read in the order suitable for being processed at a reproducing processor 125. The reproducing processor 125 decodes the reproduced signal read from the memory 121 and expands it by a decoding process of know block coding such as inverse DCT, the expanded data being output to a memory 127.

The memory 127 stores the reproduced signal supplied from the reproducing processor 125, reads it in the order suitable for display, and outputs it to an output circuit 129. The output circuit 129 converts the digital signal read from the memory 127 into an analog signal, and changes it to a signal having a format suitable for an output apparatus such as an external monitor, to output the signal from a terminal 131.

An operation unit 137 has various switches such as recording/reproducing switches, fast forward and rewind switches to output an instruction signal for each switch to a control unit 135. In accordance with an instruction from the control unit 137, the control unit 135 controls the sync/address detector 119 and a mechanism 139 including a capstan, a capstan motor, a head drum motor and the like and the transport operation of the tape 101, as will be later described.

Next, the tape format of the digital VTR of this embodiment will be described.

Figure 3:
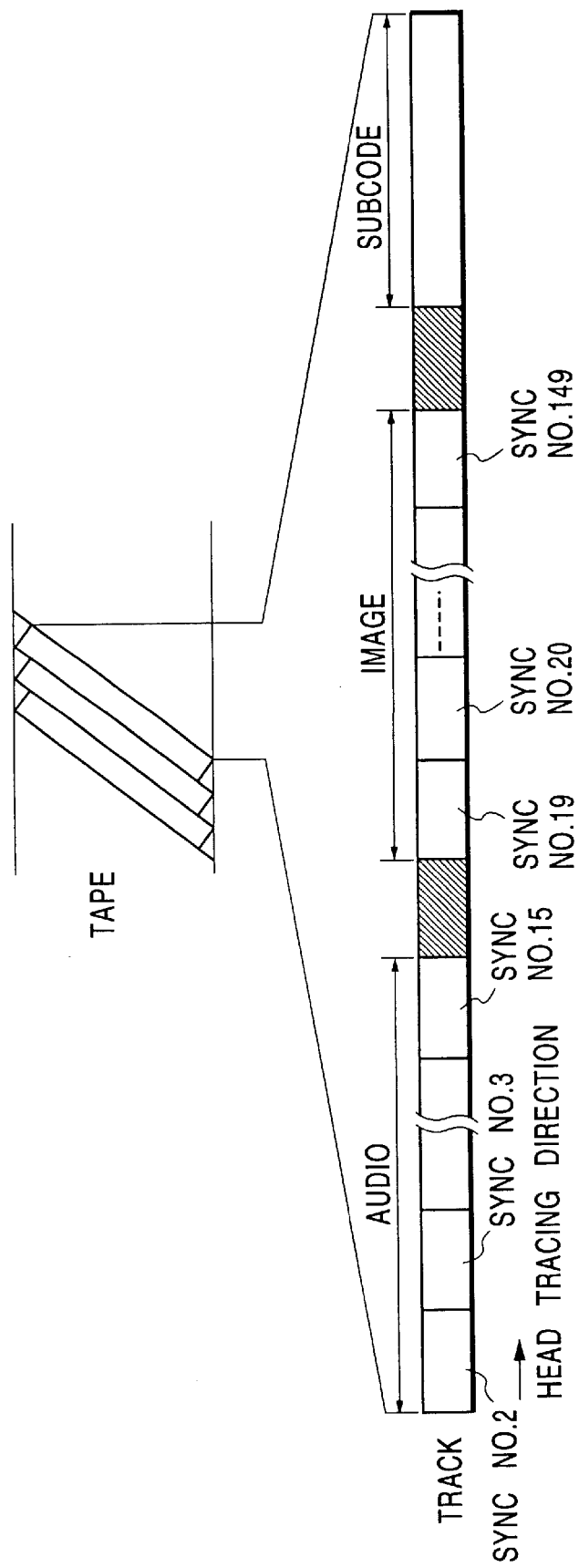
FIG. 3 shows the format of data recorded on a tape by the apparatus shown in FIG. 1.

FIG. 3 illustrates signals recorded in the tape 101. The tape 101 is formed with a number of helical tracks. Each track is recorded with audio data, video data, and subcode data in this order in a tracing direction of the head 103. Each data set is constituted of a plurality of sync blocks.

Figure 4:
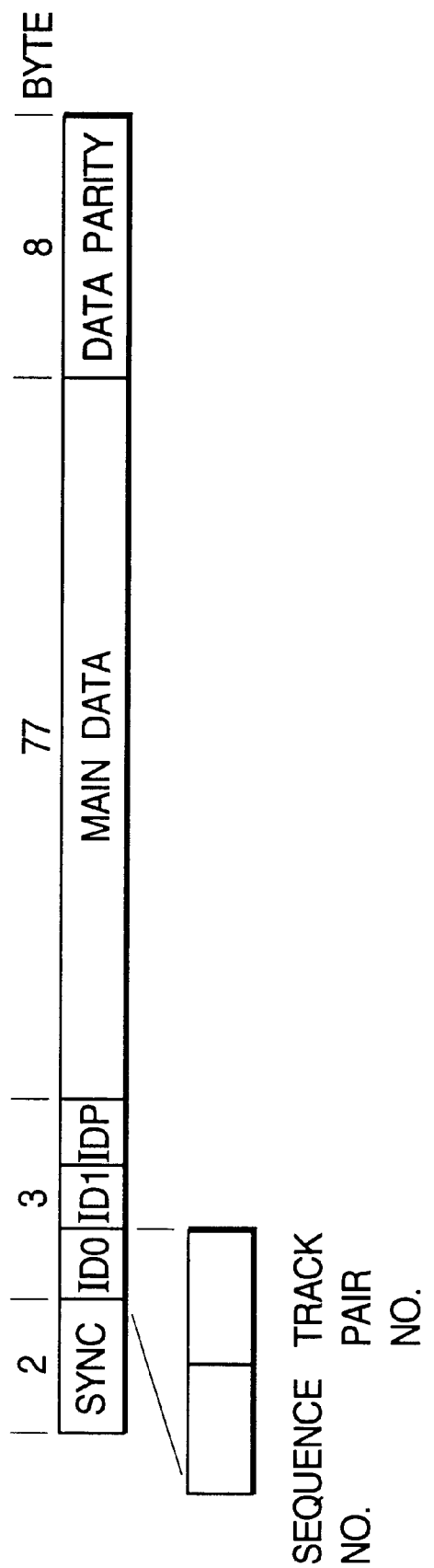
FIG. 4 is a diagram showing the structure of data used by the apparatus shown in FIG. 1.

Next, the structure of each sync block will be described. FIG. 4 shows the structure of a sync block. The sync block is constituted of 90-byte data. The sync block is recorded with, from the start thereof, 2-byte sync data, 3-byte ID data, 77-byte main data such as video, audio, C2 parity, and 8-byte data parity.

The ID data has ID0, ID1, and ID parity codes respectively of one byte. The upper four bits of ID0 are a sequence number which is incremented for each frame. The lower four bits are a track pair number assigned to two helical tracks of the tape 101. The track pair number is sequentially incremented for a plurality of tracks constituting one frame.

For example, if the recorded video signal is of NTSC, the video signals of one frame are recorded on 10 tracks in the case of the DV format. Therefore, the track pair numbers are assigned which increment in the order from "0" to "4". If the recorded video signal is of PAL, one frame is recorded on 12 tracks and the track pair numbers are assigned which increment in the order from "0" to "5".

The eight bits of Id1 are a sync block number. In the case of the DV format, the sync block numbers "2" to "15" are assigned to the audio data in one track, and the sync block numbers "19" to "167" are assigned to the video data. IDP of one byte is added to ID0 and ID1 of two bytes. IDP is data used for checking whether there is any error in the reproduced ID0 and ID1. With IDP, errors of eight bits can be detected among a total of 24 bits of ID0, ID1, and IDP.

Data of 77 bytes after IDP is the main data. After the main data, the data parity codes of 8 bytes are added to detect and correct any error in the main data. With the data parity of 8 bytes, errors of 4 bytes at a maximum can be corrected among a total of 85 bytes of the main data and data parity.

The operation of the sync/address detector 119 will be described, the detector 119 generating a write address of the memory 121 by detecting a sync data and ID data from the reproduced data having the format described above.

Figure 5:
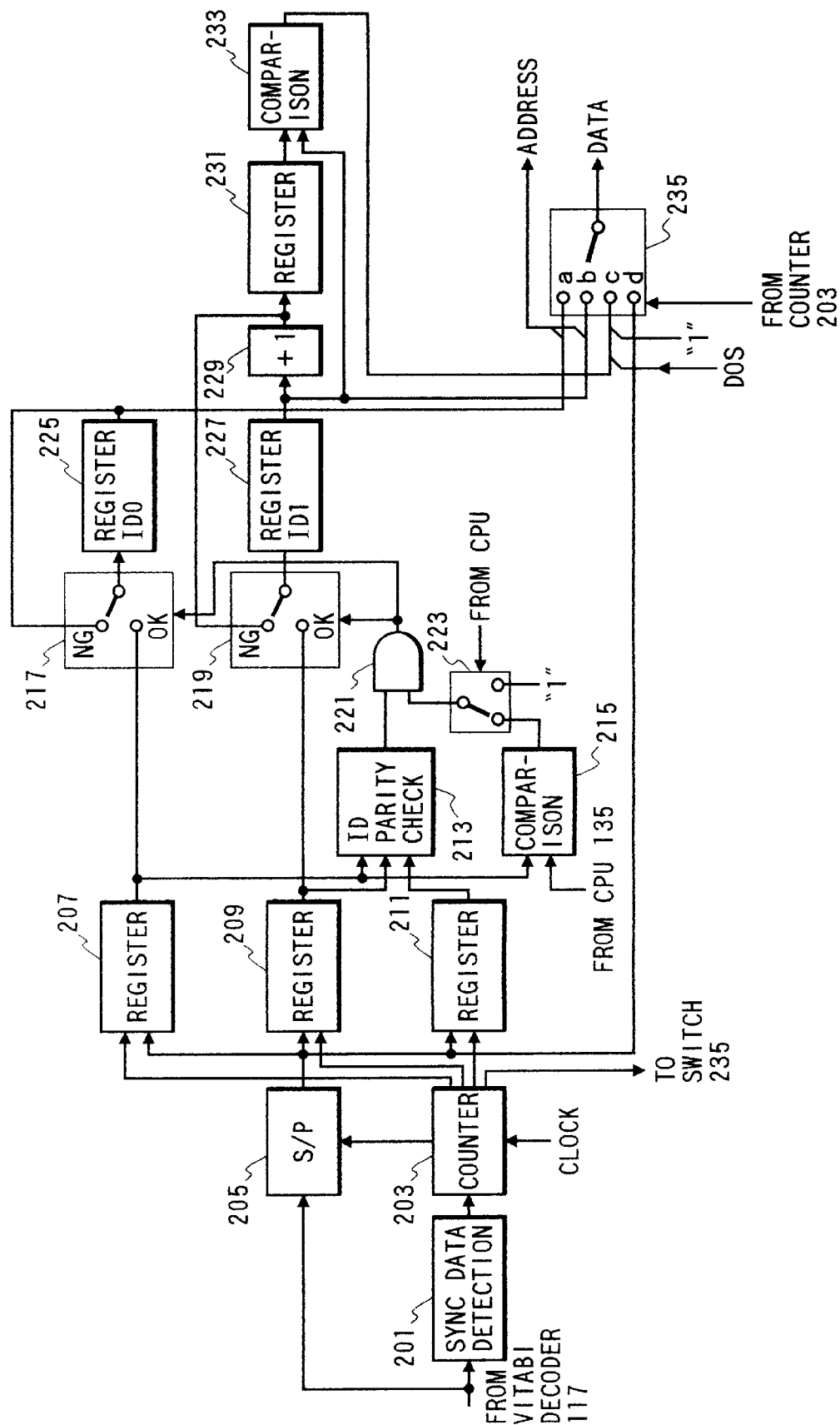
FIG. 5 is a diagram showing the structure of a sync/address detector of the apparatus shown in FIG. 1.

FIG. 5 shows the structure of the sync/address detector 119.

In FIG. 5, the reproduced signal output from the vitabi decoder 117 is supplied to a sync data detector 201 and to a serial/parallel (S/P) converter 205. The sync data detector 201 detects from the reproduced signal the sync data at the start of each sync block having a predetermined pattern, and outputs a signal indicating such a detection to a counter 203. The counter 203 counts the clock from the clock generator 133, and in response to the output from the sync data detector 201, generates various one-byte timing pulses in the unit of one sync block to supply them to main circuit portions.

In response to a one-byte timing pulse from the counter 203, the S/P converter 203 converts the input signal into a parallel signal of the 8-bit unit and outputs it to registers 207, 209, and 211 and a switch 235. The registers 207, 209, and 211 supplied with timing signals from the counter 203 load therein ID0, ID1, and IDP, respectively.

An ID parity check circuit 213 checks any error by using a total of 24 bits loaded in these registers 207, 209, and 211, and supplies a check result to one input terminal of an AND gate 223. In this embodiment, if a check by the ID parity check circuit 213 indicates no error, it outputs a signal having a logical value "1".

ID0 loaded in the register 207 is supplied to a comparator 215. The comparator 215 is being supplied from the control unit 135 with the track pair number of the track to be currently reproduced. The comparator 215 compares this track pair number from the control unit 135 with the track pair number in ID0 supplied from the register 207. If they are coincident, the comparator 235 outputs a logical "1" signal to a switch 223. Since the track pair number is incremented every second tracks during the ordinary reproduction, the control unit 135 can easily presume the track pair number to be supplied to the comparator 215.

The switch 223 is turned over in response to a control signal from the control unit (CPU) 135. For example, the switch 223 always selects the logical "1" signal during the period other than the ordinary reproduction such as a fast search and supplies it to the AND gate 221. During the ordinary reproduction, the switch 223 supplies the output from the comparator 215 to the AND gate 221. This switching is performed because during the search reproduction, the head does not trace each track precisely, but traces obliquely traversing each track so that a reproduced signal envelope is of a bead-shape of an abacus and a different track pair number may be assigned to each envelope. Although it is possible to presume the track number of a track to be reproduced, by detecting a valley of a reproduced signal envelope during the search, in this embodiment the comparison result of the comparator 215 is made invalid during the period other than the ordinary reproduction.

During the ordinary reproduction, therefore, an output of the AND gate 221 takes a logical "1" signal if the ID parity check indicates no error, and so the track pair number of the track to be reproduced can be obtained.

Switches 217 and 219 are controlled by an output of the AND gate 221. One terminal of the switch 217 is supplied with ID0 from the register 207, and the other terminal thereof is supplied with an output of a register 225. The register 225 stores ID0 of the preceding sync block output from the switch 217. When the output of the AND gate 221 is the logical "1" signal, the switch 217 selects ID0 of the currently reproduced sync block stored in the register 207 and supplies it to the register 225. When the output of the AND gate 221 is the logical "0" signal, the switch 217 selects ID0 of the previous sync block output from the register 225.

One terminal of the switch 219 is supplied with ID1 from the register 209, and the other terminal thereof is supplied with an output of an incrementer 229. The register 227 stores ID1 of the preceding sync block output from the switch 219. The incrementer 229 supplies, to a register 231 and to the other terminal of the switch 219, a value of the sync block number stored in the register 227 added with "1".

When the output of the AND gate 221 is the logical "1" signal, the switch 219 selects ID1 of the currently reproduced sync block stored in the register 209 and supplies it to the register 227. When the output of the AND gate 221 is the logical "0" signal, it is judged that the ID parity check indicates an error in the ID data during the ordinary reproduction or that the track pair number in ID0 is not correct. In this case, the switch 219 selects and supplies the output of the incrementer 229 to the register 227, this value being the preceding sync block number added with "1".

ID1 is the sync block number as described above, and is used as a write address when the reproduced signal is written in the memory 121. The sync block number is incremented sequentially in the order of sync blocks to be written. In this embodiment, therefore, if the ID data contains an error and the sync block number cannot be obtained, the sync block number of the preceding sync block is added with "1" and is used as the sync block number of the current sync block.

An output of the incrementer 229 is supplied to the register 231. Therefore, the register 231 stores the sync block number of the preceding sync block added with "1" and supplies it to a comparator 233.

The comparator 233 is being supplied with the sync block number of the currently reproduced sync block stored in the register 227. The comparator 233 compares the sync block number supplied from the register 231 with the sync block number supplied from the register 227. If they are coincident, the comparator 233 outputs the logical "0" signal.

If ID1 supplied from the register 227 is ID1 of the currently reproduced sync block, i.e., ID1 supplied from the register 209 to the register 227, they are coincident because the ID parity check indicates no error. However, in practice, as will be later described, irrespective of an error of the reproduced ID data, the ID parity check may indicate no error (hereinafter called detection error).

In this embodiment, such a detection error can be discriminated correctly, because the comparator 233 checks a continuity of reproduced sync block numbers by comparing the sync block number of the currently reproduced sync block with that of the sync block reproduced immediately before.

The switch 235 is supplied with ID0 from the register 225, ID1 from the register 227, a comparison result from the comparator 233, and a main data parity from the S/P converter 205.

Figure 6:
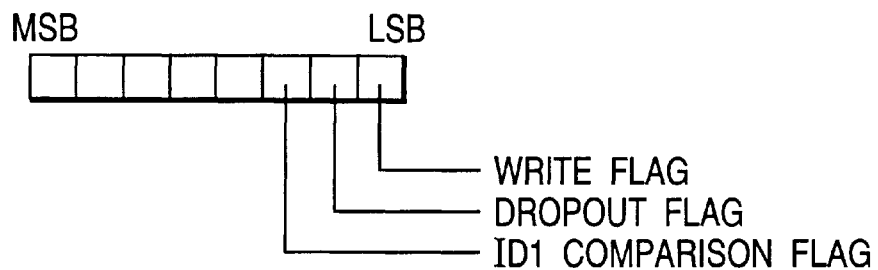
FIG. 6 is a diagram showing various flags output from the circuit shown in FIG. 5.

In response to the output from the counter 203, the switch 235 sequentially selects each of ID0 and ID1 and outputs it to the memory 121. Since the ID parity check circuit 213 has checked IDP already, IDP is not necessary to be written in the memory 121. Each of various flags is inserted at the position of IDP. Example of these flags are shown in FIG. 6.

In this embodiment, three flags are used including a write flag, a dropout flag, and a comparison flag in this order from LSB.

The write flag is a flag which always writes "1". As will be later described, the ECC processor 123 writes "0" in advance at all write addresses of the memory 121 where the write flag is written. Therefore, the write addresses of the memory 121 where the data output from the sync/address detector 119 is written have the write flag "1". On the other hand, the write flag at the correct address where data of a sync block written at an incorrect address because of detection error of the ID parity is to be written, maintains "0". By checking this write flag, the ECC processor 123 can easily detect the sync block not properly reproduced because of dropout or a dent on the envelope during search.

The dropout detection flag takes "1" if an unrepresented dropout detector outputs a dropout signal (hereinafter called DOS).

The ECC processor 123 performs an error correction process for data of a sync block having the write flag or dropout flag of "1", assuming that the data has a low reliability.

The comparison flag is an output of the comparator 233, as described above, and takes "1" if there is no continuity between sync block numbers.

In response of the count of the counter 203, the switch 235 selects and outputs data at each terminal. Specifically, immediately after the sync data is detected, the terminal a is selected. When the next one-byte clock is input, the terminal b is selected. When the second byte clock is input, the terminal c is selected, and thereafter the terminal d is selected.

Each of ID0 and ID1 is output as the write address of the memory 121.

An example of detection error of ID data is shown below.

|         | ID0 | ID1 | IDP |
|---------|-----|-----|-----|
| Correct | 64  | 08  | 12  |
| Error   | 66  | 02  | 12  |

In this embodiment, 88-byte data excepting the sync data is subjected to an exclusive logical sum operation with randomized patterns. If 4 bits in total among the 24 bits of ID data are errors, the ID parity check may judge as no error even if both ID0 and ID1 are errors.

The above combinations of ID data both correspond to patterns with no error of the IDP check, and these detection error patterns was observed actually.

Figure 7:
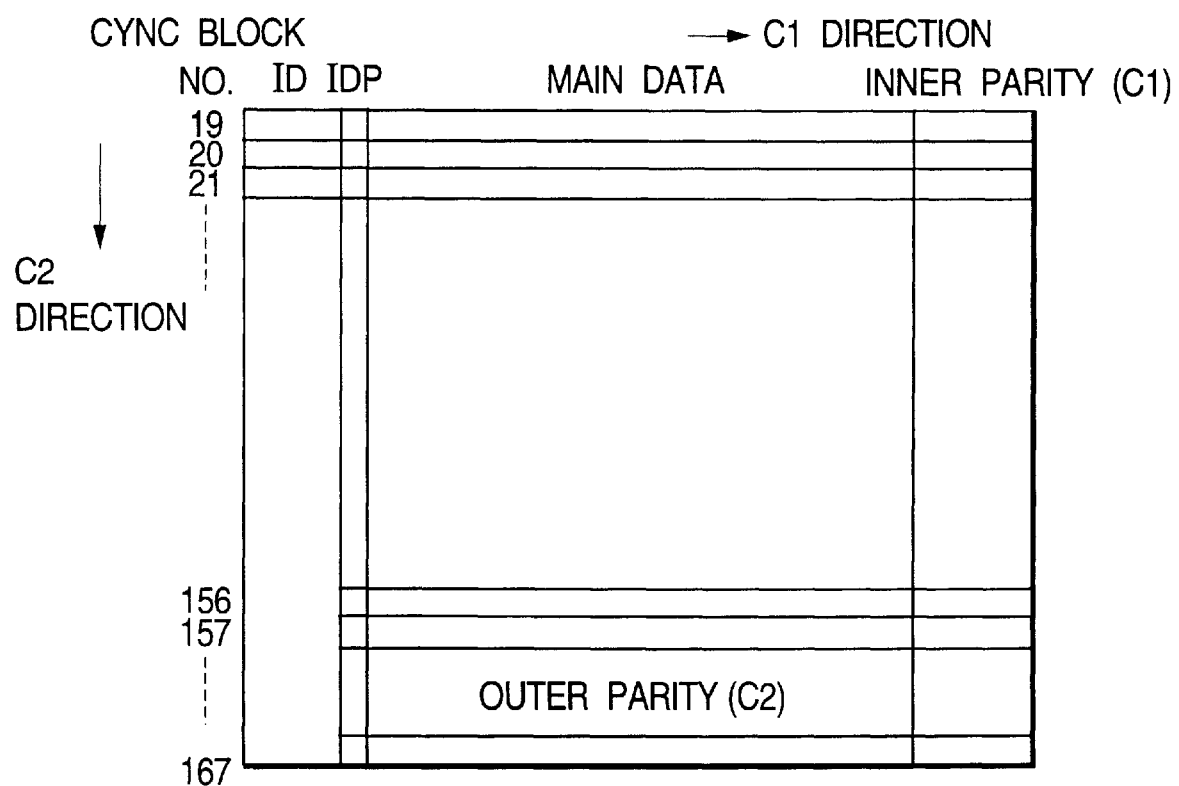
FIG. 7 is a diagram showing the structure of data used by the apparatus shown in FIG. 1.

The format of image data of one track is shown in FIG. 7.

Image data (main data) is constituted of Reed Solomon product codes. As shown in FIG. 7, by using C1 parity codes (inner codes) and C2 parity codes (outer codes), the image in one track is error-correction coded separately both in the vertical direction (C2 direction) and in the horizontal direction (C1 direction). If all data of a certain sync block is not written in the memory, the ECC processor judges that all data of this sync block is error and performs an error correction process. With the vertical and horizontal correction by C1 and C2 codes, all data in the sync block not written in the memory can be recovered (corrected) if the number of errors is within an allowable range.

However, if detection error occurs in ID data as described above, the main data and data parity of each sync block themselves are written in the memory at the different write address where data of another sync block is to be written. Therefore, if there is no error in the main data, the correction by the C1 direction cannot detect an error and the ECC processor cannot detect a data write caused by ID data detection error. Accordingly, the data of this sync block becomes noises.

In this embodiment, ID detection error is detected based upon the continuity of ID data in the reproduced signal as described above. The ECC processor performs an error correction process in accordance with the comparison flag indicating the ID detection error. The operation of the ECC processor 123 will be described hereinunder.

The ECC processor 123 of the present embodiment is a RISC processor of a stored program type.

Figure 8:
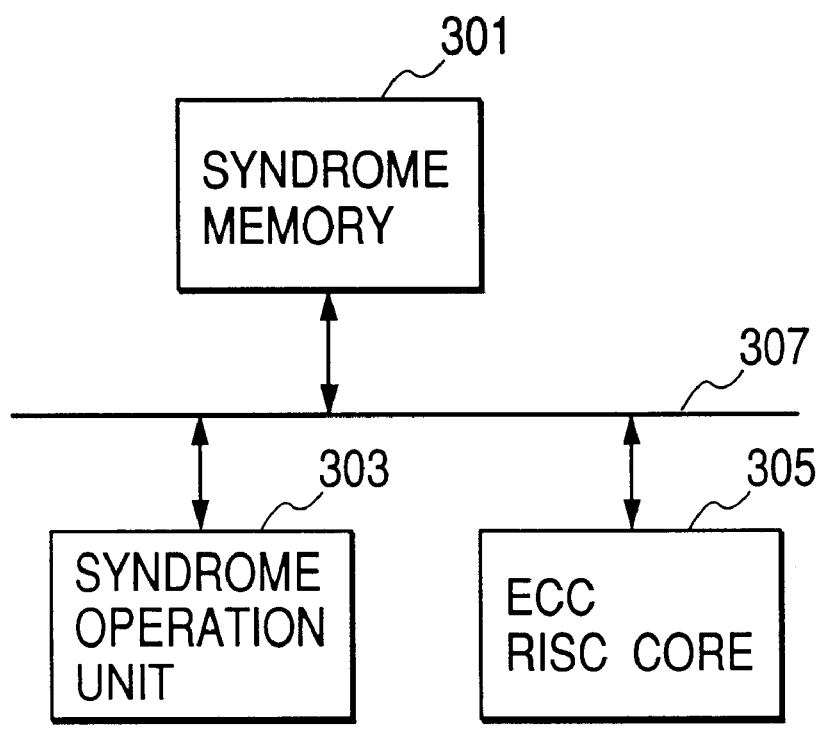
FIG. 8 is a diagram showing the structure of an ECC processor of the apparatus shown in FIG. 1.

FIG. 8 is a block diagram showing the structure of the ECC processor 123.

In FIG. 8, a syndrome operation unit 303 reads data in the unit of one track from the memory 121 via a bus 307 to perform a syndrome operation. Each flag shown in FIG. 5 is being supplied to the syndrome operation unit 303. Syndromes calculated by the syndrome operation unit 303 are output via the bus 307 to a syndrome memory 301. At this time, it is checked whether all the coefficients of each syndrome polynomial are 0. If the coefficients are all 0, it is judged that the codes have no error and a syndrome error flag is not set. If the syndrome polynomial has a coefficient other than 0, it is judged that the codes have an error or errors and the syndrome error flag is set.

Each flag has one-byte field. Bits of the syndrome error flag are different from the comparison flag obtained by the sync/address detector 119.

Figures 9, 9A:
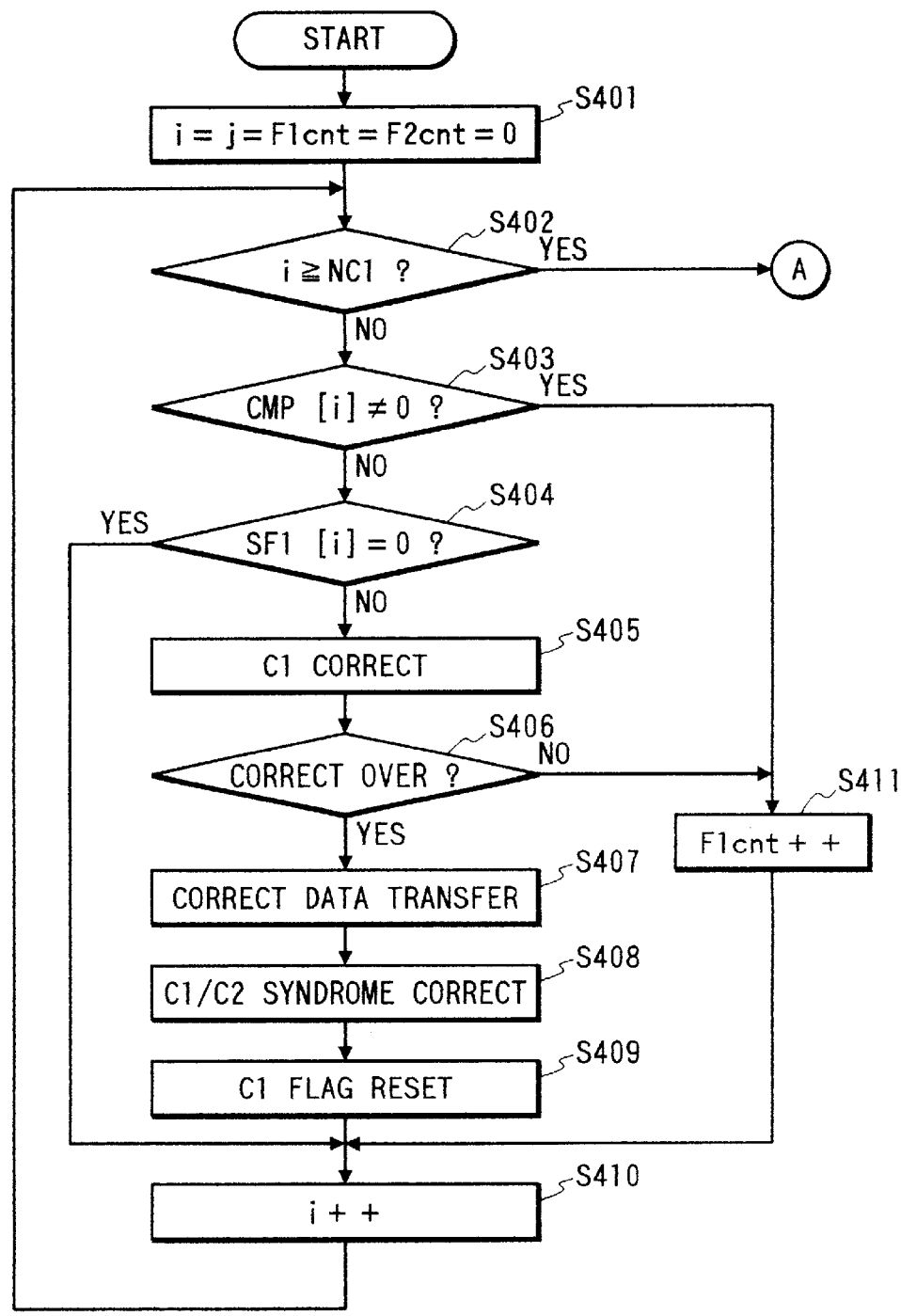
FIG. 9 which is composed of FIGS. 9A and 9B are flow charts illustrating the operation of the circuit shown in FIG. 8.
Figure 9B:
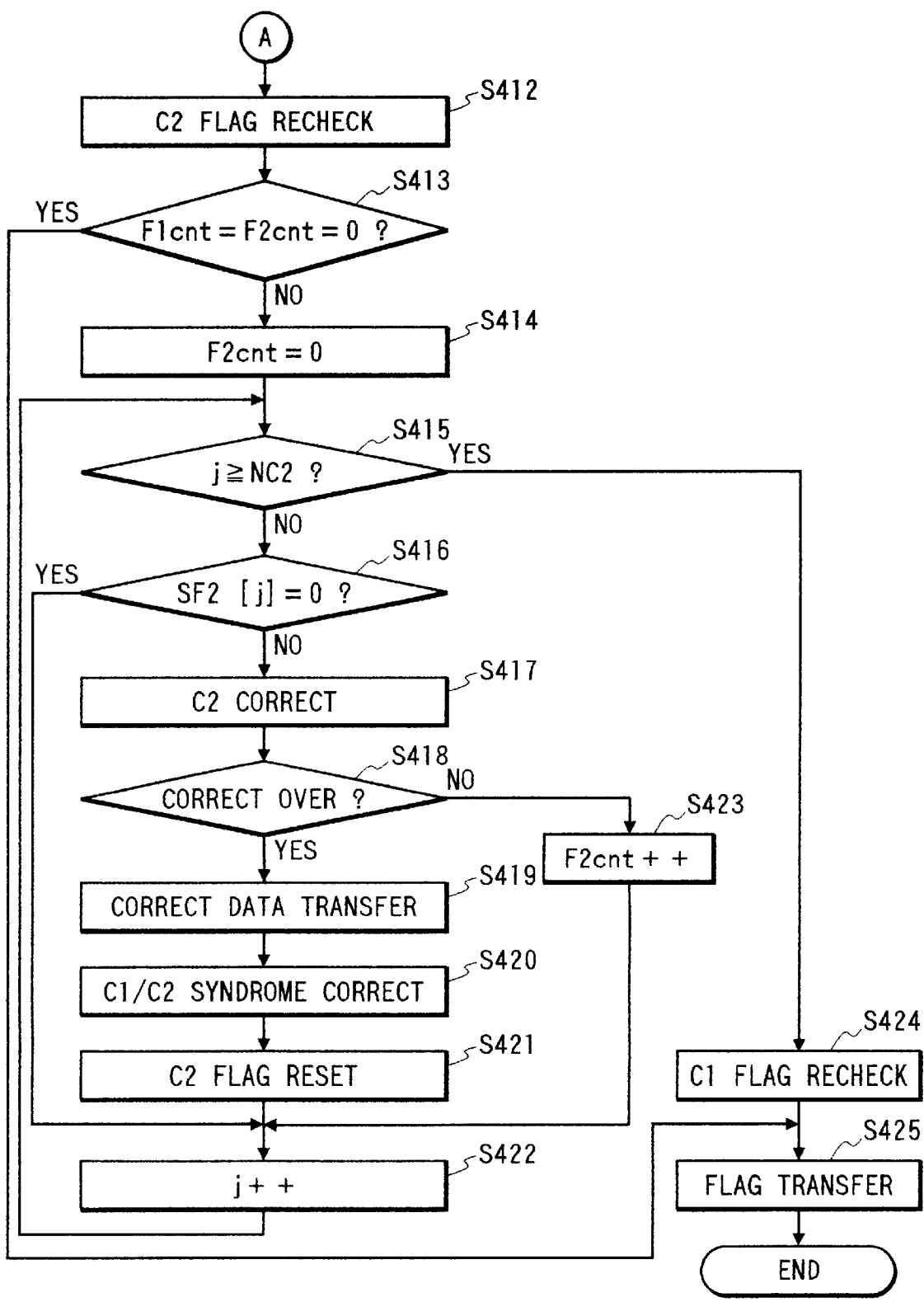

FIGS. 9A and 9B are flow charts illustrating the operation of the ECC processor 123. With reference to FIGS. 9A and 9B, the error correction operation of the ECC processor will be described.

As the correction process starts, 0 is set to a variable i, the C1 code error flag (C1EF) counter F1cnt, a variable j, and a C2 code error flag (C2EF) counter F2cnt (Step S401).

Next, it is checked whether or not the variable i is a C1 code number NC1 or larger (Step S402). If not, it is checked whether or not the comparison flag CMPF[i] for the i-th C1 code (sync block) is 0 (Step S403).

If CMPF[i] is 0, it is checked whether or not the syndrome flag SF1[i] for the i-th C1 code (sync block) is 0 (Step S404). If SF1[i] is 0, there is no error to be corrected so that the flow advances to Step S410 to increment the variable i and return to Step S402. If SF1[i] is not 0, the C1 code has an error or errors so that the C1 code is corrected by using the Euclid method·chain search or the like (Step S405). It is checked whether or not the C1 code has been corrected (Step S406).

If corrected, there are as many data addresses and values as the number of errors. Therefore, data is read from the memory 121 at the address where the data to be corrected is stored, and an exclusive logical sum of the read data and the correction value is stored in the memory 121 at the corresponding address (Step S409). The syndromes of the C1 and C2 codes are updated (Step S408), C1EF is set to 0 (Step S409), and the variable i is incremented (Step S410) to thereafter return to the judgement Step S402.

If CMPF[i] is not 0 at Step S403, the C1 code itself has an error. In this case, the C1 code is not corrected in order to avoid correction error, but the C1EF counter F1cnt is incremented (Step S411) to thereafter return to the judgement Step S402.

If the variable i is NC1 or larger at Step S402, the C1 correction is terminated.

The completion of the C1 correction has changed the syndrome of the C2 code so that the C2 error flag is rechecked. If all the coefficient of the syndrome polynomial are 0, the C2 code has no error so that C2EF is set to 0. If the coefficients are not all 0, C2EF is set to renew it and at the same time the number of set C2EFs is counted and output to the C2EF counter F2cnt (Step S412).

Next, if both F1cnt and F2cnt counted at Step S411 are 0, it is judged that all the errors have been corrected, and the flag information is transferred to the memory 121 (Step S425) to terminate the error correction process.

If both F1cnt and F2cnt counted at Step S411 are not 0, F2cnt is set to 0 (Step S414) and it is checked whether or not the variable j is NC2 or larger (Step S415).

If the variable j is smaller than NC2, it is checked whether or not the j-th syndrome error flag SF2[j] is 0 (Step S416). If SF2[j] is not 0, it is judged that the C2 code has an error or errors, and the C2 code is corrected by using the Euclid method·chain search or the like (Step S417). It is checked whether or not the C2 code has been corrected (Step S418).

If corrected, there are as many data addresses and values as the number of errors. Therefore, data is read from the memory 121 at the address where the data to be corrected is stored, and an exclusive logical sum of the read data and the correction value is stored in the memory 121 at the corresponding address (Step S419). The syndromes of the C1 and C2 codes are updated (Step S420), C2EF is set to 0 (Step S421), and the variable j is incremented (Step S422) to thereafter return to the judgement Step S415.

If the C2 code cannot be corrected at Step S418, F2cnt is incremented (Step S423) and the variable j is incremented to thereafter return to the judgement Step S415.

If the variable j is NC2 or larger at Step S415, the C2 correction is terminated. The completion of the C2 correction has changed the syndrome of the C1 code so that C1EF is rechecked. If all the coefficient of the syndrome polynomial are 0, the C1 code has no error so that C1EF is set to 0. If the coefficients are not all 0, C1EF is set to renew it (Step S424) and the flag information is transferred to the memory 121 (Step S425) to terminate the correction process.

In this embodiment, as to the C1 code not subjected to the correction process, the correction entered when the C2 code is corrected is considered to be reliable. Namely, if there is an error or errors unable to be corrected when the C2 code is corrected, interpolation is performed by using the memory 121 similar to the data unable to be corrected.

This interpolation is performed from the following reason. If the sync block, which is judged from the comparison flag at the C2 correction after the C1 correction or the like as having an error or errors, cannot be corrected, the data written at the incorrect address is judged as having no error or as having been corrected and output as noises. The interpolation avoids this case.

Furthermore, during the repetitive corrections such as C1→C2→C1→C2, if the sync block, which is judged from the comparison flag at the C2 correction after the C1 correction or the like as having an error or errors, is corrected only partially, a certain code at the incorrect position is replaced by the data before the C2 correction or by completely different data when the C1 correction is performed at the second time, and the replaced data is output as noises. The interpolation avoids this case.

As above, in this embodiment, correction error of the ID data is detected on the basis of the continuity of ID data, and this correction error information is stored in the memory by setting the comparison flag. The ECC processor does not perform the C1 code correction process for the sync block data set with the comparison flag, but performs the correction process only for the C2 code. It is therefore possible to prevent data correction error to be caused otherwise by the ID correction error.

The sync/address detector compares the track pair number in the reproduced ID0 with the track number of a track from the control unit to be reproduced currently to thereby check the reliability of data, and thereafter generates the write address of the memory 121. Therefore, even if there is correction error of IDP, this can be detected reliably and a correct write address can be generated.

In this embodiment, although the C1 and C2 corrections each are performed once, similar advantages may be expected even for the repetition of C1→C2, for C1→C2→C1→erasure correction, and for C1→erasure correction, if the C1 correction is not performed for the sync block set with the comparison flag.

The erasure correction is a correction by which only error values inclusive of error positions are calculated. The error flag for the C1 correction has an important-roll of identifying the error position. Specifically, even if the error position is incorrect, the error value is calculated so that correction error occurs. In order to avoid this, it is necessary to perform the erasure correction by setting an error flag to the sync block which was judged as having an error or errors by the comparison flag.

In the above embodiment, the sync/address detector 119 checks the track pair number of each sync block and the continuity of sync block numbers. This check operation may be performed by the ECC processor 123. The second embodiment of the invention will be described hereinunder in which the ECC processor performs such a check operation.

FIG. 10 shows the structure of a sync/address detector 119 according to the second embodiment of the invention. The whole structure of a digital VTR of the second embodiment is similar to that shown in FIG. 1.

In FIG. 10, the reproduced signal output from the vitabi decoder 117 is supplied to a sync data detector 501 and to a serial/parallel (S/P) converter 505. Similar to the sync data detector 201 shown in FIG. 5, the sync data detector 501 detects from the reproduced signal the sync data at the start of each sync block, and outputs a signal indicating a detection to a counter 503. The counter 503 counts the clock from the clock generator 133, and in response to the output from the sync data detector 501, generates various one-byte timing pulses in the unit of one sync block to supply them to main circuit portions.

In response to a one-byte timing pulse from the counter 503, the S/P converter 503 converts the input signal into a parallel signal of the 8-bit unit and outputs it to registers 507, 509, and 511. The registers 507, 509, and 511 supplied with timing signals from the counter 503 load therein ID0, ID1, and IDP, respectively.

An ID parity check circuit 513 checks any error by using a total of 24 bits loaded in these registers 507, 509, and 511, and supplies a check result to one input terminal a of a switch 519. In this embodiment, if a check by the ID parity check circuit 513 indicates no error, it outputs a signal having a logical value "1" as an ID parity check flag.

The reproduced signal output from the S/P converter 505 is delayed by two-byte clocks by a delay circuit 515 and supplied to the other terminal b of the switch. The two-byte clocks correspond to the period necessary for the ID parity check circuit 513 to check the ID parity.

In response of the count of the counter 503, the switch 519 selects the terminal b during the period of two bytes from the start of each sync block and outputs each of ID0 and ID1 data. Thereafter, the switch 519 selects the terminal a during the period of one byte data to output data containing the ID parity check flag, dropout flag, and write flag. Thereafter, the switch 519 again selects the terminal b to output the main data and data parity to the memory 121.

Figure 11:
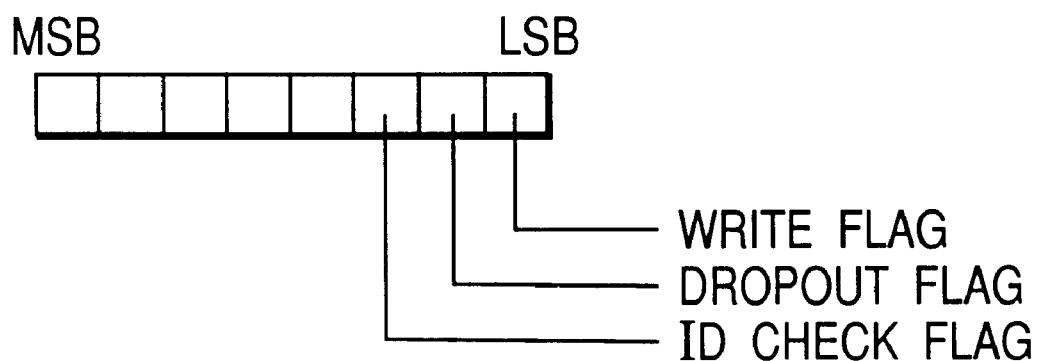
FIG. 11 is a diagram showing various flags output from the circuit shown in FIG. 10.

As described with the first embodiment, since the ID parity check circuit 513 has checked IDP already, IDP is not necessary to be written in the memory 121. Each of various flags is inserted at the position of IDP. As shown in FIG. 11, in this embodiment, as compared to the flags of the first embodiment shown in FIG. 6, the ID parity check flag is inserted in place of the comparison flag. In this embodiment, therefore, three flags are inserted including the write flag, dropout flag, and ID parity check flag in this order from LSB.

In this embodiment, the count of a counter 517 counting the clock is used as a write address of the memory 121. When data of 88 bytes of one sync block is written in the memory 121, the counter 517 is incremented and the next sync block data is written at the next write address.

The counter 517 is reset at each track by a signal (head switch pulse: HSP) indicating the start of a reproduction operation of each track with the head 103. This HSP signal is generated by using a PG signal generated by a circuit (not shown) for detecting a rotary phase of the head 103.

As above, in this embodiment, the write address of the memory 121 for the reproduced signal is not generated in accordance with the sync block number data in ID1, but the reproduced signals are sequentially written in the memory 121 in the order of fast reproduced signal.

As will be later described, the ECC processor 123 checks the reliability of ID data by using the ID parity check flag, and performs the error detection of the reproduced data.

Next, the processes to be executed by the ECC processor 123 will be described. The structure of the ECC processor 123 of this embodiment is the same as that shown in FIG. 8.

Figure 12B:
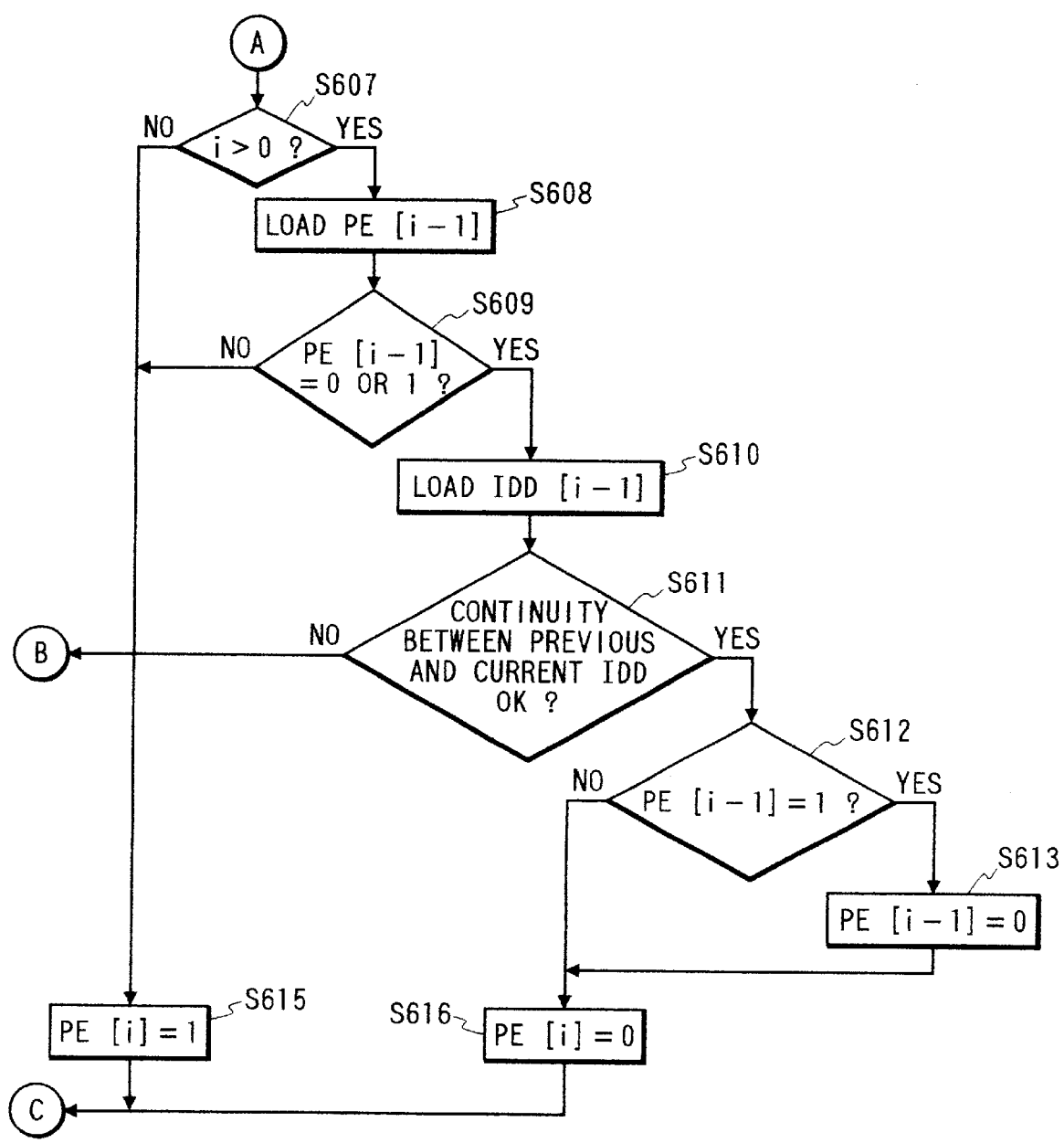
FIG. 12 which is composed of FIGS. 12A and 12B are flow charts illustrating an ID check process according to a second embodiment of the invention.

FIGS. 12A and 12B are flow charts illustrating the ID check process to be executed by the ECC processor 123. The ID check process by the ECC processor 123 will be described with reference to FIGS. 12A and 12B.

As the ID check process starts, the variable i is set to 0 (Step S601). The ID parity check flag IDF[i] of the i-th sync block is read from the memory 121 (Step S602). It is checked whether the ID parity check shows any error (Step S603).

If the ID parity check shows no error, the ID data IDD[i] of the i-th sync block is read from the memory 121 (Step S604), and it is checked whether the track pair number represented by IDD[i] is the track pair number of a track to be currently reproduced (Step S605). If the track pair number is correct, it is further checked whether the sequence number is correct (Step S606).

If the sequence number is also correct, it is checked whether the variable i is larger than 0 (Step S607). If the variable i is larger than 0, it means that there is a sync block with its ID check already performed. Therefore, the ID check flag PE[i−1] indicating an ID check result of the (i−1)-th sync block is read (Step S608) to check whether PE[i−1] is 0 or 1 (Step S609).

If PE[i−1] is 0 or 1, the ID data IDD[i−1] of the (i−1)-th sync block is read from the memory 121 (Step S610) to check whether there is a continuity between IDD[i] and IDD[i−1] (Step S611). The continuity is judged from the sync block number, track pair number and sequence number.

If it is judged at Step S611 that there is a continuity with ID data of the preceding sync block, it is judged whether PE[i−1] is 1 (Step S612). If PE[i] is 1, it is judged that the address (ID data) of the preceding sync block is correct. In this case, PE[i−1] is set to 0 and the ID check flag PE[i] of the i-th sync block is set to 0. If PE[i−1] is 0, PE[i] is also set to 0 (Step S616).

If IDF[i] is not 0 at Step S603, if the track pair number of the i-th sync block is not correct at Step S605, or if there is no continuity of ID data between the i-th sync block and the (i−1)-th sync block at Step S611, then it is judged that the position (ID data) of the i-th sync block is incorrect, and PE[i] is set to 3 (Step S614).

If the variable i is 0 at Step S607 (i.e., if the sync block is the first sync block) and if PE[i−1] is not 0 or 1 at Step S609, it is judged that the continuity with the preceding sync block is uncertain, and PE[i] is set to 1 to follow the ID check process for the next sync block (Step S615).

At Steps S614, S615 and S616, after a value is set to the ID check flag PE[i] of the i-th sync block, the variable i is incremented (Step S617), and if the variable i is the number NC1 of codes in the C1 direction or larger, the process is terminated, whereas if smaller than NC1, the flow returns back to Step S602 (Step S618).

Figures 13, 13A:
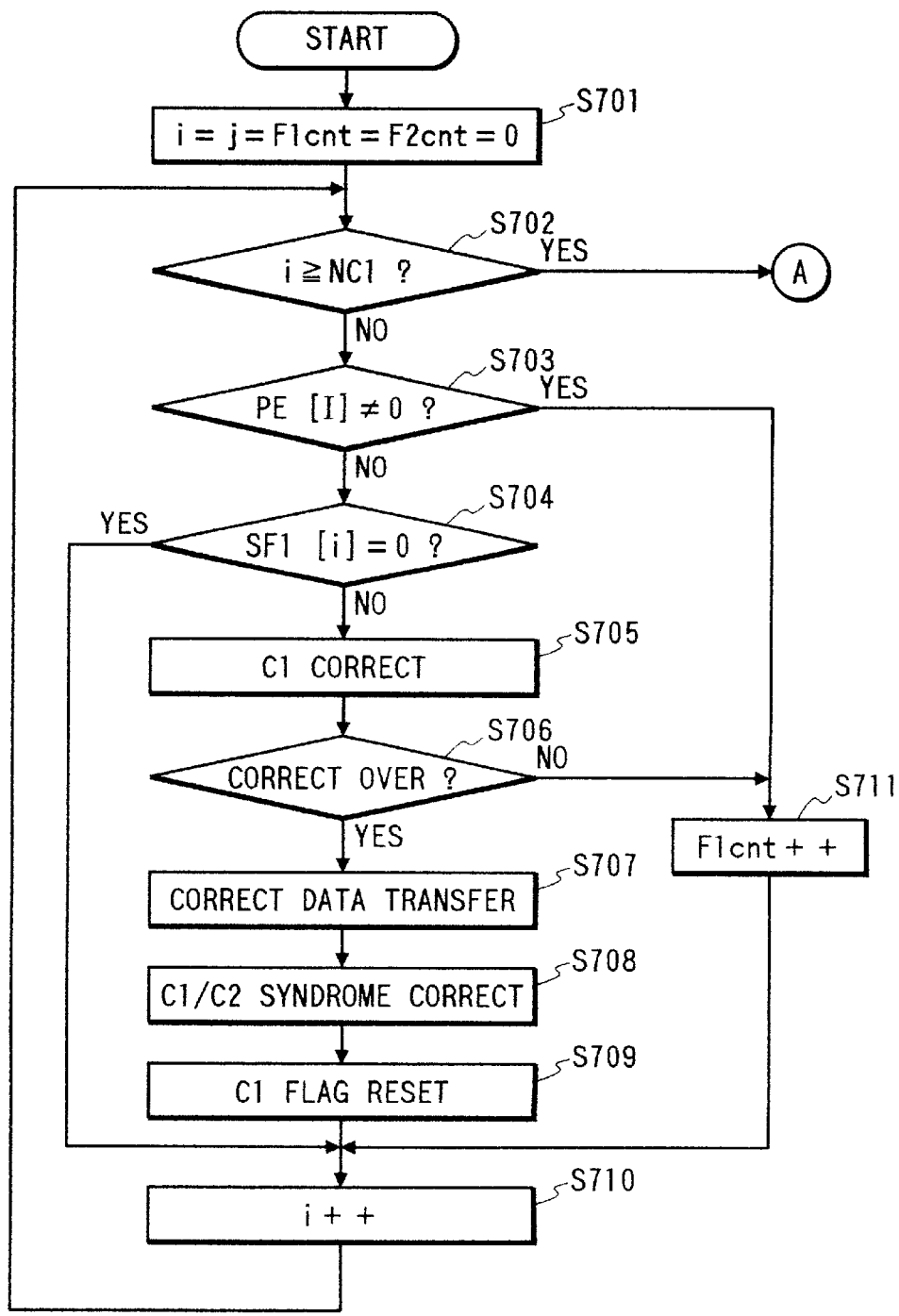
FIG. 13 which is composed of FIGS. 13A and 13B are flow charts illustrating an error correction process according to the second embodiment of the invention.
Figure 13B:
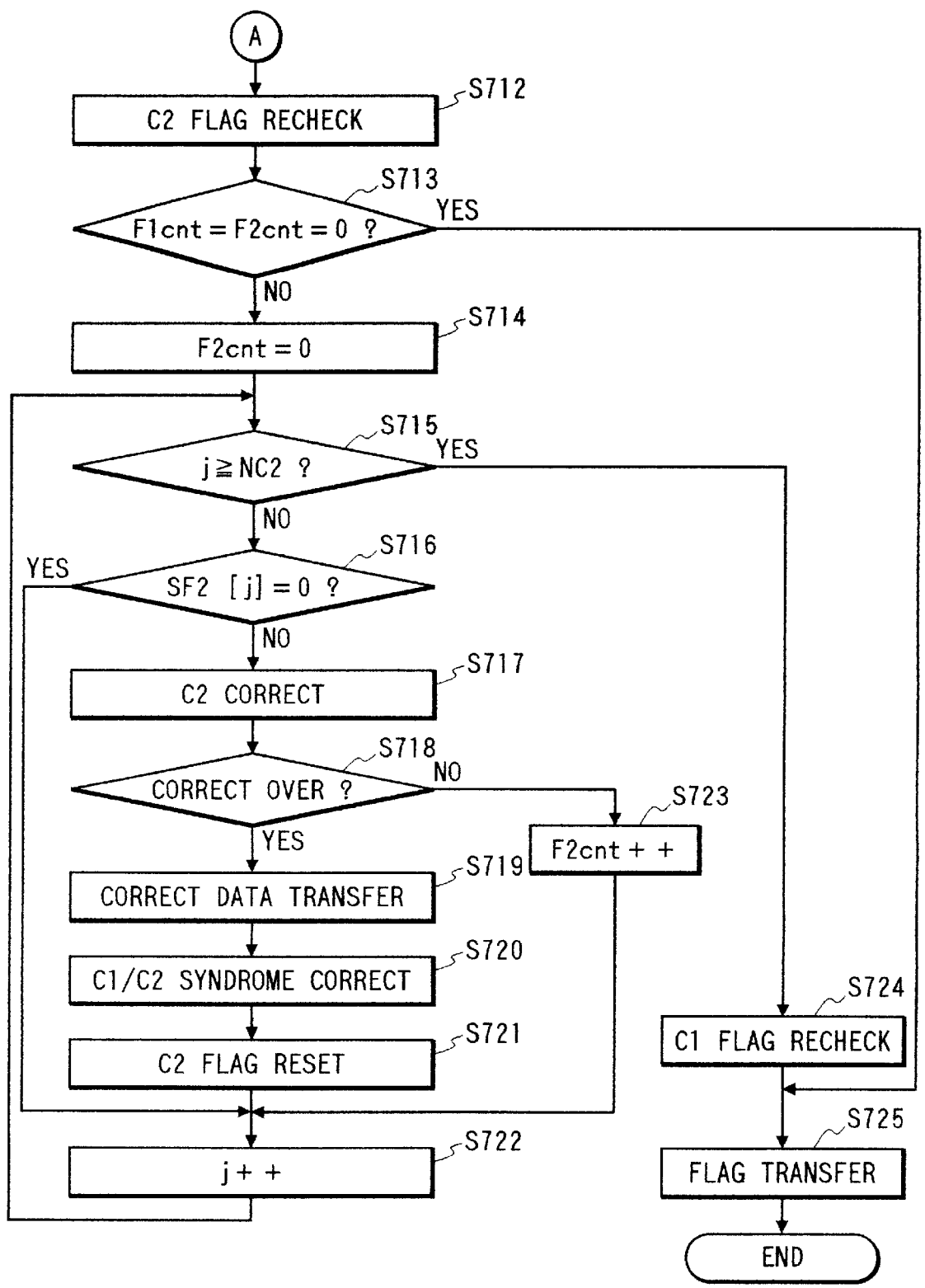

After the ID check process, the ECC processor 123 performs the error correction process. FIGS. 13A and 13B are flow charts illustrating the error correction process to be executed by the ECC processor 123.

The error correction process shown in FIGS. 13A and 13B are fundamentally the same as that shown in FIGS. 9A and 9B, with an exception that the ID check flag IDF[i] is used in place of the comparison flag CMPF[i].

As the correction process starts, 0 is set to the variable i, C1EF counter F1cnt, variable j, and C2EF counter F2cnt (Step S701).

Next, it is checked whether or not the variable i is a C1 code number NC1 or larger (Step S702). If not, it is checked whether or not the ID check flag IDF[i] for the i-th C1 code (sync block) is 0 (Step S703).

If IDF[i] is 0, it is checked whether or not the syndrome error flag SF1[i] for the i-th C1 code is 0 (Step S704). If SF1[i] is 0, there is no error to be corrected so that the flow advances to Step S710 to increment the variable i and return to the judgement Step S702. If SF1[i] is not 0, the C1 code has an error or errors so that the C1 code is corrected by using the Euclid method·chain search or the like (Step S705). It is checked whether or not the C1 code has been corrected (Step S706).

If corrected, there are as many data addresses and values as the number of errors. Therefore, data is read from the memory 121 at the address where the data to be corrected is stored, and an exclusive logical sum of the read data and the correction value is stored in the memory 121 at the corresponding address (Step S709). The syndromes of the C1 and C2 codes are updated (Step S708), C1EF is set to 0 (Step S709), and the variable i is incremented (Step S710) to thereafter return to the judgement Step S702.

If IDF[i] is not 0 at Step S703, the C1 code itself has an error. In this case, the C1 code is not corrected in order to avoid correction error, but the C1EF counter F1cnt is incremented (Step S711) to thereafter return to the judgement Step S702.

If the variable i is NC1 or larger at Step S702, the C1 correction is terminated.

The completion of the C1 correction has changed the syndrome of the C2 code so that the C2 error flag is rechecked. If all the coefficient of the syndrome polynomial are 0, the C2 code has no error so that C2EF is set to 0. If the coefficients are not all 0, C2EF is set to renew it and at the same time the number of set C2EFs is counted and output to the C2EF counter F2cnt (Step S712).

Next, if both F1cnt and F2cnt counted at Step S711 are 0, it is judged that all the errors have been corrected, and the flag information is transferred to the memory 121 (Step S725) to terminate the error correction process.

If both F1cnt and F2cnt counted at Step S411 are not 0, F2cnt is set to 0 (Step S714) and it is checked whether or not the variable j is NC2 or larger (Step S715).

If the variable j is smaller than NC2, it is checked whether or not the j-th syndrome error flag SF2[j] is 0 (Step S716). If SF2[j] is not 0, it is judged that the C2 code has an error or errors, and the C2 code is corrected by using the Euclid method·chain search or the like (Step S717). It is checked whether or not the C2 code has been corrected (Step S718).

If corrected, there are as many data addresses and values as the number of errors. Therefore, data is read from the memory 121 at the address where the data to be corrected is stored, and an exclusive logical sum of the read data and the correction value is stored in the memory 121 at the corresponding address (Step S719). The syndromes of the C1 and C2 codes are updated (Step S720), C2EF is set to 0 (Step S721), and the variable j is incremented (Step S722) to thereafter return to the judgement Step S715.

If the C2 code cannot be corrected at Step S718, F2cnt is incremented (Step S723) and the variable j is incremented to thereafter return to the judgement Step S715.

If the variable j is NC2 or larger at Step S715, the C2 correction is terminated. The completion of the C2 correction has changed the syndrome of the C1 code so that C1EF is rechecked. If all the coefficient of the syndrome polynomial are 0, the C1 code has no error so that C1EF is set to 0. If the coefficients are not all 0, C1EF is set to renew it (Step S724) and the flag information is transferred to the memory 121 (Step S725) to terminate the correction process.

Similar to the first embodiment, in the second embodiment, as to the C1 code not subjected to the correction process, the correction entered when the C2 code is corrected is considered to be reliable. Namely, if there is an error or errors unable to be corrected when the C2 code is corrected, interpolation is performed by using the memory 121 similar to the data unable to be corrected.

As above, in this embodiment, correction error of the ID data is detected on the basis of the continuity of ID data, and this correction error information is stored in the memory by setting the comparison flag. The ECC processor does not perform the C1 code correction process for the sync block data set with the ID check flag, but performs the correction process only for the C2 code. It is therefore possible to prevent data correction error to be caused otherwise by the ID correction error.

Figure 14B:
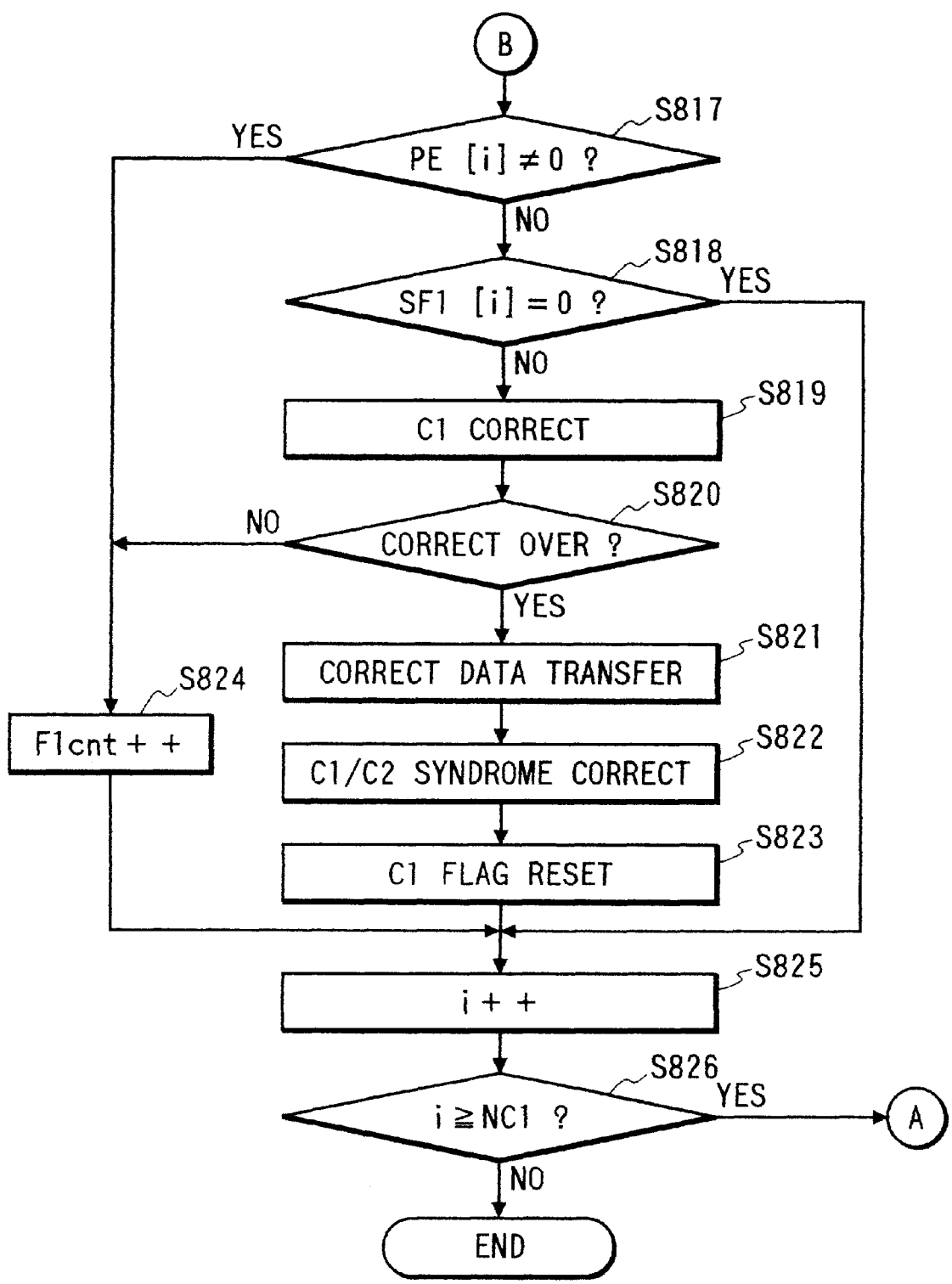
FIG. 14 which is composed of FIGS. 14A and 14B are flow charts illustrating an error correction process according to a third embodiment of the invention.

In this embodiment, although the ECC processor 123 performs the ID check process and C1 correction process separately, the ID check process may be performed while the C1 correction process is performed, as shown in FIGS. 14A and 14B.

In FIG. 14A, Steps S802 to S816 correspond to Steps S602 to S616 shown in FIGS. 12A and 12B, and Step S801 and Steps S817 to S826 correspond to Step S701 and Steps S702 to S710 shown in FIG. 13A.

In the description of the above embodiments, the present invention is applied to a digital VTR. The present invention is also applicable to an apparatus for recording/reproducing data with ID data, with similar advantageous effects as above.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproducing apparatus, comprising:
    reproducing means for reproducing digital data from a recording medium formed with a number of tracks, the digital data being composed of a plurality of sync blocks each including information data, sync data and ID data, the ID data including track position information of a track recorded with the information data, wherein when a plurality of the sync blocks are recorded in one track, the track position information in the ID data of each of the plurality of sync blocks recorded in the same track indicates the same value;
    supplying means for supplying comparison data having a value corresponding to a position of a track from which the digital data is to be reproduced by said reproducing means;
    checking means for checking a reliability of the ID data using the comparison data and the track position information in the ID data reproduced by said reproducing means;
    storing means for storing the information data reproduced by said reproducing means; and
    address generating means for generating a write address of the information data in said storing means, said address generating means generating the write address in different manners according to a check result of said checking means.

2. An apparatus according to claim 1, wherein the digital data includes ID error check data for checking an error in the ID data, and said checking means further checks a reliability of the ID data using the ID error check data.

3. An apparatus according to claim 1, wherein the information data includes video data, the video data of one frame is recorded in n tracks formed on the recording medium, where n is an integer 2 or larger, and the track position information indicates a position of the track on which the information data is recorded, from among the n tracks.

4. An apparatus according to claim 1, further comprising:
    detecting means for detecting a reliability of current ID data using current ID data reproduced by said reproducing means and ID data reproduced before the current ID data, and error correcting means for correcting an error in the information data using a detection result of said detecting means.

5. An apparatus according to claim 4, wherein the ID data includes position information indicating a record position of the information data in the recording medium, said detecting means predicts position information of the current ID data using the position information of the ID data reproduced before the current ID and detects the reliability of the current ID data by comparing the predicted position information of the current ID data with the position information in the current ID data reproduced by said reproducing means.

6. An apparatus according to claim 4, wherein the apparatus has an ordinary reproduction mode and a specific reproduction mode, and said error correcting means performs the error correction process in the ordinary reproduction mode by using the detection result by said detecting means, and performs the error correction process in the specific reproduction mode without using the detection result by said detecting means.

7. An apparatus according to claim 4, wherein a sequence of an error correction process is changed in accordance with the detection result of said detecting means.

8. An apparatus according to claim 7, wherein the digital data is error-correction-encoded in a product code configuration, and if said detecting means detects that the information data has a low reliability, said error correcting means does not perform the error correction process of correction codes in a first direction, the error correction process being a process of correcting an error of the low reliability information data and the ID data of the low reliability information data, but performs the error correction process of correction codes in a second direction perpendicular to the first direction.

9. A reproducing method comprising the step of:
    reproducing digital data from a recording medium formed with a number of tracks, the digital data being composed of a plurality of sync blocks each including information data, sync data and ID data, the ID data including track position information of a track recorded with the information data, wherein when a plurality of the sync blocks are recorded in one track, the track position information in the ID data of each of the plurality of sync blocks recorded in the same trace indicates the same value;
    supplying comparison data having a value corresponding to a position of a track from which the digital data is to be reproduced in said reproducing step;

checking a reliability of the ID data using the comparison data and the track position information in the ID data reproduced in said reproducing step;

storing the information data reproduced by said reproducing means in storing means; and generating a write address of the information data in said storing means, said generating step including a step of generating the write address in different manners according to a check result in said checking step.

10. A method according to claim 9, wherein the digital data includes ID error check data for checking an error in the ID data, and said checking step further checks a reliability of the ID data using the ID error check data.

11. A method according to claim 9, wherein the information data includes video data, the video data of one frame is recorded in n tracks formed on the recording medium, where n is an integer 2 or larger, and the track position information indicates a position of the track on which the information data is recorded, from among the n tracks.

12. A method according to claim 9, further comprising the steps of:

detecting a reliability of current ID data using the current ID data reproduced in said reproducing step and ID data reproduced before the current ID data, and correcting an error in the information data using a detection result in said detecting step.

13. A method according to claim 12, wherein the ID data includes position information indicating a record position of the information data in the recording medium, said detecting step predicts position information of the current ID data using position information of the ID data reproduced before the current ID data and detects the reliability of the current ID data by comparing the predicted position information of the current ID data with the position information in the current ID data reproduced in said reproducing step.

14. A method according to claim 12, wherein said method is operable in an ordinary reproduction mode and a specific reproduction mode, and said error correcting step performs an error correction process in the ordinary reproduction mode using the detection result in said detecting step, and performs the error correction process in the specific reproduction mode without using the detection result in said detecting step.

15. A method according to claim 12, wherein a sequence of an error correction process is changed in accordance with the detection result in said detecting step.

16. A method according to claim 15, wherein the digital data is error-correction-encoded in a product code configuration, and if said detecting step detects that the information data has a low reliability, said error correcting step does not perform the error correction process of correction codes in a first direction, the error correction process being a process of correcting an error of the low reliability information data and the ID data of the low reliability information data, but performs the error correction process of correction codes in a second direction perpendicular to the first direction.

17. A reproducing apparatus comprising:

reproducing means for reproducing digital data from a recording medium formed with a number of tracks, the digital data composed of a plurality of sync blocks each including information data, sync data, and ID data, the ID data including track position information of a track recorded with the information data and block number information having continuous values between adjacent sync blocks, the track position information in the ID data of each of the plurality of sync blocks recorded in the same track indicating the same value;

supply means for supplying comparison data having a value corresponding to a position of a track from which the digital data is to be reproduced by said reproducing means; and checking means for comparing the track position information in the ID data reproduced by said reproducing means and the comparison data and for checking a reliability of the ID data reproduced by said reproducing means in accordance with the comparison result of the ID data and the comparison data, and a continuity between the block number information in the ID data of two sync blocks, reproduced from the same track.

18. A reproducing apparatus comprising:

reproducing means for reproducing digital data from a recording medium formed with a number of tracks, the digital data being composed of a plurality of sync blocks each including information data, sync data, and ID data, the ID data including track position information of a track recorded with the information data and block number information having continuous values between adjacent sync blocks, the track position information in the ID data of each of the plurality of sync blocks recorded in the same track indicating the same value, the value of the track position information changing every predetermined number of tracks;

supply means for supplying comparison data having a value corresponding to a position of a track from which the digital data is to be reproduced by said reproducing means; and checking means for comparing the track position information in the ID data reproduced by said reproducing means and the comparison data, and for checking a reliability of the ID data reproduced by said reproducing means in accordance with a comparison result of the ID data and the comparison data, and a continuity between the block number information in the ID data of two blocks reproduced from the same track.

19. A reproducing apparatus comprising:

reproducing means for reproducing digital data from a recording medium formed with a number of tracks, the digital data being composed of a plurality of blocks each including information data, ID data including track position information of a track recorded with the information data and ID error check data for checking an error in the ID data, the track position information in the ID data of each of the plurality of blocks recorded in the same track indicating the same value;

ID error checking means for checking an error in the ID data reproduced by said reproducing means using the ID error check data;

supply means for supplying comparison data having a value corresponding to a position of a track from which the digital data is to be reproduced by said reproducing means;

comparing means for comparing the track position information in the ID data reproduced by said reproducing means and the comparison data; and reliability checking means for checking a reliability of the ID data reproduced by said reproducing means in accordance with an error check result by said ID error checking means and a comparison result by said comparing means.

20. An apparatus according to claim 7, wherein said checking means predicts the value of the block number information in the ID data of a current one of two sync blocks using a previous one of two sync blocks and detecting the continuity by comparing the predicted block number information with the block number information in the ID data of the current sync block.

21. An apparatus according to claim 7, further comprising:

storing means for storing the information data reproduced by said reproducing means; and address generating means for generating a write address of the information in said storing means, said address generating means selectively generating the write address in one of plural different manners according to a reliability check result by said reliability checking means.

22. An apparatus according to claim 9, further comprising:

storing means for storing the information data reproduced by said reproducing means; and address generating means for generating a write address of the information in said storing means, said address generating means selectively generating the write address in one of plural different manners according to a reliability check result by said reliability checking means.

23. An apparatus according to claim 22, wherein the ID data includes block number information indicating block numbers of the plurality of blocks in one track, said address generating means generating the write address using the block number information in the ID data reproduced by said reproducing means.

24. An apparatus according to claim 9, wherein the value of the track position information changes every predetermined number of tracks.

* * * * *

UNITED STATES PATENT AND TRADEMARK OFFICE
CERTIFICATE OF CORRECTION

PATENT NO.    : 6,522,831 B2
DATED         : February 18, 2003
INVENTOR(S)   : Yasuyuki Tanaka et al.

It is certified that error appears in the above-identified patent and that said Letters Patent is hereby corrected as shown below:

<u>Title page,</u>
Item [*] Notice, insert: This patent issued on a continued prosecution application filed under 37 CFR 1.53(d), and is subject to the twenty year patent term provisions of 35 U.S.C. 154(a)(2). --

<u>Column 3,</u>
Line 43, "know" should read -- known --.

<u>Column 9,</u>
Line 56, "important-roll" should read -- important role --.

<u>Column 14,</u>
Line 35, "the error" should read -- an error --.
Line 36, "by using" should read -- using --; and "by said" should read -- of said --.
Line 39, "by said" should read -- of said --.
Line 53, "step" should read -- steps --.
Line 63, "same trace" should read -- same track --.

<u>Column 17,</u>
Lines 1 and 8, "claim 7," should read -- claim 17, --.
Line 18, "claim 9," should read -- claim 19, --.

<u>Column 18,</u>
Line 15, "claim 9," should read -- claim 19 --.

Signed and Sealed this

Sixteenth Day of December, 2003

JAMES E. ROGAN
*Director of the United States Patent and Trademark Office*